UNITED STATES PATENT OFFICE.

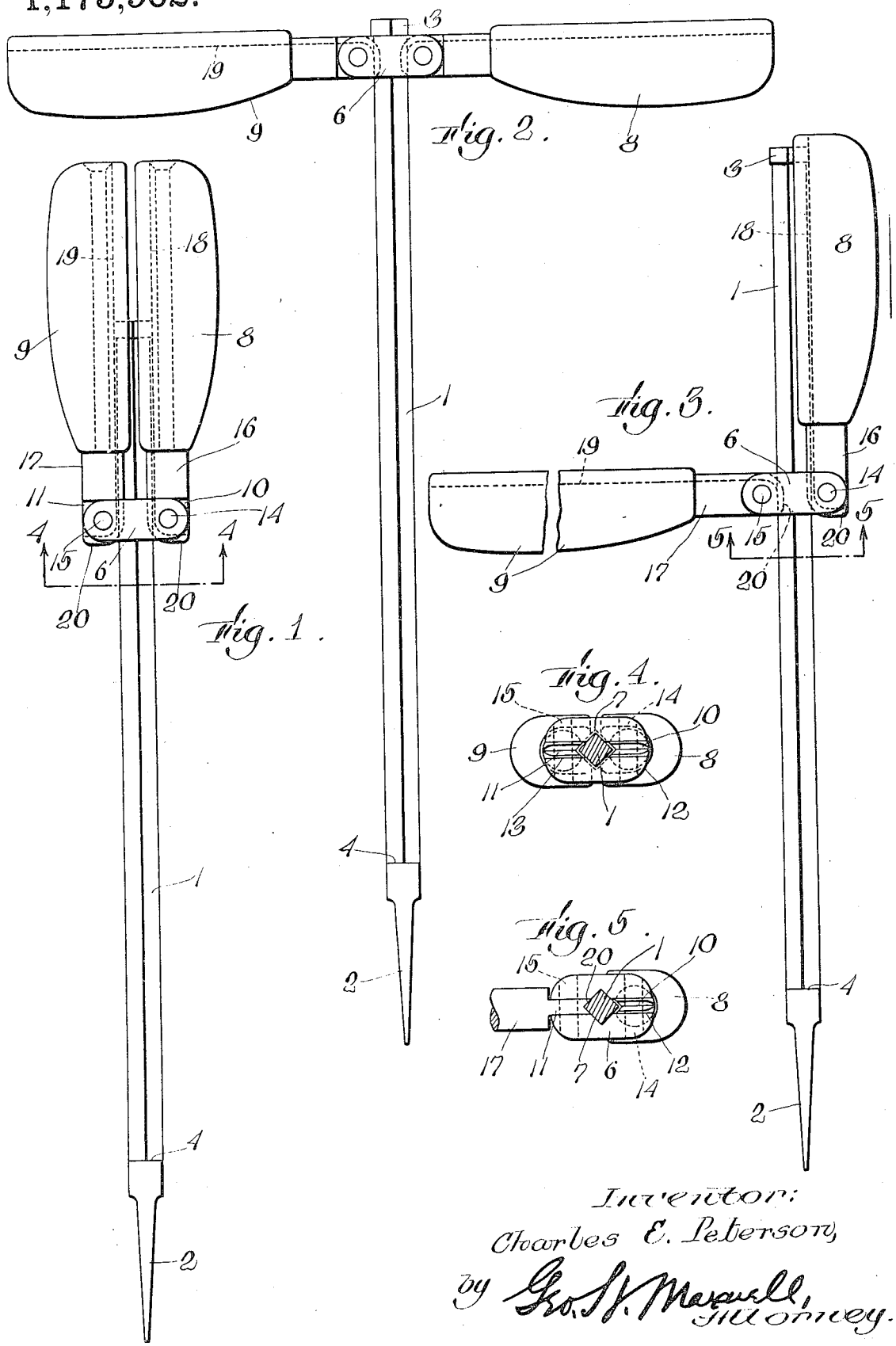

CHARLES E. PETERSON, OF DORCHESTER, MASSACHUSETTS, ASSIGNOR OF ONE-HALF TO HANS W. CHRISTENSEN, OF DORCHESTER, MASSACHUSETTS.

SCREW-DRIVER.

1,175,902.

Specification of Letters Patent.

Patented Mar. 14, 1916.

Application filed June 3, 1915. Serial No. 31,850.

*To all whom it may concern:*

Be it known that I, CHARLES E. PETERSON, a citizen of the United States, and resident of Dorchester, in the county of Suffolk and State of Massachusetts, have invented an Improvement in Screw-Drivers, of which the following description, in connection with the accompanying drawings, is a specification, like letters on the drawings representing like parts.

My present invention is an improved screw driver, and the object of the invention is to provide an adjustable handle capable of increasing the power applied to the instrument at any point on the shank or blade and to automatically hold or bind the handle at such point.

My improved screw driver is not only capable of use as an ordinary article, *i. e.* with the power and pressure applied to the end of the shank or blade portion, but is so constructed and arranged as to permit the handle to be moved longitudinally of the shank, and to increase the leverage of the handle and at the same time automatically bind the handle and shank at any point to which said handle has been moved, and thus permit of turning pressure and downwardly holding power to be applied. It will be readily appreciated that in many uses to which a tool of this character is put, the handle is often in the way, and the advantages incident to having a movable handle which may be slid along the shank, either above or below an obstacle, is of importance; and heretofore it has been necessary to use separate means to bind the handle and shank together for operating same. In my improved construction I form a slide capable of moving longitudinally along the shank, and to this slide I pivot the two halves forming the handle, which have extensions beyond said pivot so as to bind and hold the slide at any desired point on the rod.

Other features of the invention, novel details of construction, and advantages will be hereinafter more fully pointed out and claimed.

Referring to the drawings, illustrating my improved screw driver in preferred form, Figure 1 is a side view with the handles in normal position; Fig. 2 being a similar view with the handle portions extended; Fig. 3 being a view with one handle portion extended and the other in normal position; Fig. 4 is a view, partly in cross section, on the line 4—4 of Fig. 1; and Fig. 5 is a view, partly in cross section, on the line 5—5 of Fig. 3.

I make the shank 1 of angular form in cross section, having at its lower portion the usual slot engaging blade 2 and at its top a slightly flanged part 3. A shoulder 4 being provided between the shank 1 and blade 2 so that the flange 3 and shoulder 4 act as stops to limit the movement of the slide 6 on said shank. This slide is formed with a central slot 7 of similar angular form to that of the shank 1 and of slightly greater size, so as to permit the slide to easily slide upon the shank 1. I have illustrated the angular form of the shank 1 and the corresponding slide 7 as square, but it will be understood that a triangular or other form may be employed with equal facility, or a keyway may be used so as to permit the slide 6 to traverse the shank 1 between the limits afforded by flange 3 and shoulder 4, while insuring that both slide and shank will rotate in unison. To this slide is pivoted the handle portions 8 and 9 at opposite points, said handles having reduced end portions 10 and 11 fitting in corresponding slots 12 and 13 respectively in said slide member, so as to receive the pivot pins 14 and 15.

The handles 8 and 9 preferably have metallic centers or cores 16 and 17 respectively, on which metallic portions the reduced shanks are formed to receive said pivots; or the entire handles may be of metal if desired. As the slide 6 is preferably formed with the handles pivoted thereto at opposite sides, cornerwise of the shank 1; I prefer to form grooves in said handles, as indicated in dotted lines at 18 and 19, to permit the handles to be folded snugly about the shank, so that each half will, when thus folded against the shank, form a substantial integral part with said shank, to permit of downward pressure thereon, aid in holding, and the like. The slide 6 may thus be moved longitudinally of the shank 1, and either or both handles swung outwardly to provide increased leverage and power. To enable the handle and shank to be automatically and firmly united at any point on said shank to which the slide may be positioned, I provide means on the inner ends of each handle portion to engage a point upon the shank to hold the slide in adjusted position. This feature is of special importance, enabling the handles to be moved upwardly or downwardly until the most convenient point on the shank is reached for operation, and then by the simple outwardly swinging movement of either or both handles, to firmly and solidly bind the slide 6, and consequently the handles upon the shank, so as to permit downward force to be applied as well as turning leverage. This binding means comprises short eccentric extensions on each handle portion 16 and 17 beyond their respective pivot pins 14 and 15. Such extensions being clearly indicated in Figs. 1, 2, and 3 at 20. The extension portions 20 are also preferably grooved to fit snugly and firmly upon and against the adjacent corner of the angular shank 1. These extensions 20 are of suitable eccentric or cam-like form so as to act as stops to prevent the handles being swung below a position at right angles to the shank 1. As illustrated in Fig. 3, the handle 9 can only be swung downwardly to approximately right angle position of the shank 1, because of the formation of its cam-like end portion 20, which jams and binds between the pivot 15 and shank 1. Preferably each eccentric portion 20 is of sufficient extent so as to provide the automatic binding action between the slide 6 and shank 1, irrespective of whether or not the opposite handle portion and its eccentric are outwardly extended or not, whereby the slide is held firmly with the handles as shown in Fig. 2, or as shown in Fig. 3.

The operation of my improved screw driver will be readily understood from the drawings, the user being enabled at all times to instantly change the leverage desired, from the normal position illustrated in Fig. 1 to that shown in Fig. 3, or with the handles in extreme winged position as shown by Fig. 2. Furthermore, the slide 6 is instantly held in any position throughout the length of the shank 1 by the clamping action of the eccentrics 20, when either or both of the handles are swung downwardly. When the handles 8 and 9 are in closed position as shown in Fig. 1, the clamping action of the grooved sections 18 and 19 upon the shank 1 will ordinarily serve to hold the handle and prevent slipping during use, being firmly clamped against the shank by the hand of the user or the slide 6 may be moved downwardly into seating engagement with the shoulder 4 while the handles are thus folded.

I have referred to the slide 6 as a single member with a slot 7 therein corresponding to the angular form of the shank 1 on which it slides and said slide may be so made, although I prefer to form it in two sections as shown in the drawings, with the pivot pins uniting the same. Said pins may be in the form of studs on one side fitting into and headed in corresponding apertures on the other side, or may be made in any other manner desired. Also various other details of the construction may be varied without departing from the spirit and scope of my invention.

The advantage of a screw driver with the adjustability of its handle portions as above described, will be readily appreciated, and its use in many difficult positions, adjacent obstacles, in corners, and the like, will be found to be of great value and importance.

Having described my invention, what I claim as new and desire to secure by Letters Patent is:

A screw driver of the kind described, having a two-part handle, a shank and a sliding member fitted on said shank and arranged to slide longitudinally thereof in non-turning relation thereto, each of said handles being pivoted to said slide member at opposite sides of the shank, each handle having a grooved portion extending beyond said pivot and adapted to fit upon and engage the shank with a non-turning grip, each handle having an inside groove to partially inclose and fit on said shank irrespective of the position of the handles longitudinally thereon.

In testimony whereof, I have signed my name to this specification, in the presence of two subscribing witnesses.

CHARLES E. PETERSON.

Witnesses:
H. W. CHRISTENSEN,
JAMES R. HODDER.